United States Patent
Tonogi

(10) Patent No.: US 12,451,752 B2
(45) Date of Patent: Oct. 21, 2025

(54) ROTATING ELECTRIC MACHINE

(71) Applicant: KABUSHIKI KAISHA TOYOTA JIDOSHOKKI, Kariya (JP)

(72) Inventor: Kazuki Tonogi, Kariya (JP)

(73) Assignee: KABUSHIKI KAISHA TOYOTA JIDOSHOKKI, Kariya (JP)

(*) Notice: Subject to any disclaimer, the term of this patent is extended or adjusted under 35 U.S.C. 154(b) by 427 days.

(21) Appl. No.: 18/079,575

(22) Filed: Dec. 12, 2022

(65) Prior Publication Data

US 2023/0198330 A1 Jun. 22, 2023

(30) Foreign Application Priority Data

Dec. 16, 2021 (JP) ................. 2021-204055

(51) Int. Cl.
*H02K 3/52* (2006.01)
*H02K 1/14* (2006.01)
*H02K 21/20* (2006.01)

(52) U.S. Cl.
CPC ............ *H02K 3/522* (2013.01); *H02K 1/146* (2013.01); *H02K 21/20* (2013.01); *H02K 2203/06* (2013.01); *H02K 2203/09* (2013.01); *H02K 2203/12* (2013.01)

(58) Field of Classification Search
CPC ........ H02K 3/522; H02K 1/146; H02K 21/20; H02K 2203/06; H02K 2203/09; H02K 2203/12
USPC ........................................................ 310/71
See application file for complete search history.

(56) References Cited

U.S. PATENT DOCUMENTS

| 2004/0055140 | A1 | 3/2004 | Cha | |
| 2006/0038454 | A1* | 2/2006 | Bojiuc | H02K 99/20 310/112 |
| 2008/0129243 | A1 | 6/2008 | Nashiki | |
| 2009/0051234 | A1* | 2/2009 | Yamane | H02K 3/18 310/71 |
| 2011/0297474 | A1 | 12/2011 | Aono et al. | |
| 2023/0238846 | A1* | 7/2023 | Murphy | H02K 21/20 310/178 |

(Continued)

FOREIGN PATENT DOCUMENTS

| JP | 2004-120997 A | 4/2004 |
| JP | 2006-296146 A | 10/2006 |
| JP | 2008-141835 A | 6/2008 |

(Continued)

*Primary Examiner* — Forrest M Phillips
(74) *Attorney, Agent, or Firm* — Sughrue Mion, PLLC

(57) ABSTRACT

An electric motor includes a stator and a rotor rotatable relative to the stator. The stator includes: a stator core including a yoke portion having a cylindrical shape and twelve teeth each protruding radially inward from the yoke portion; and coils of three phases, a winding being concentratedly wound around each of the teeth to form each of the coils. The number of poles of the rotor is two. The teeth include two teeth located adjacent to each other in a circumferential direction and forming a teeth portion, and windings of a same phase are respectively wound in a same direction around the two teeth forming the teeth portion and are connected in series. The teeth are arranged such that the teeth portions adjacent to each other are different in phase and the three phases are arranged sequentially side by side in the circumferential direction.

5 Claims, 9 Drawing Sheets

(56) References Cited

U.S. PATENT DOCUMENTS

2024/0283331 A1* 8/2024 Birkmayer ............. H02K 1/148

FOREIGN PATENT DOCUMENTS

| JP | 2010-200400 A | 9/2010 | | |
|---|---|---|---|---|
| JP | 2012-060831 A | 3/2012 | | |
| JP | 2014-158421 A | 8/2014 | | |
| WO | WO-9319512 A1 * | 9/1993 | ............. | H02K 19/18 |
| WO | 2007/052385 A1 | 5/2007 | | |
| WO | WO-2018170726 A1 * | 9/2018 | ............. | H02K 21/16 |

* cited by examiner

ROTATING ELECTRIC MACHINE

This nonprovisional application is based on Japanese Patent Application No. 2021-204055 filed on Dec. 16, 2021 with the Japan Patent Office, the entire contents of which are hereby incorporated by reference.

BACKGROUND

The present disclosure relates to a rotating electric machine.

DESCRIPTION OF THE BACKGROUND ART

Japanese Patent Laying-Open No. 2006-296146 discloses a stator of an electric motor, in which tooth portions are arranged in an annular shape, a resin bobbin is attached to each of the tooth portions, and a winding is concentratedly wound around the resin bobbin. A winding start line of the winding is wound around a side surface of each tooth portion inside a slot of the resin bobbin attached to the tooth portion. Then, after the final turn of the winding around the tooth portion ends, the winding is guided along a crossover line to extend to an adjacent tooth portion.

SUMMARY

In the electric motor required to rotate at a high speed, it is desirable in terms of control that the number of poles is two that is the smallest number. In the electric motor disclosed in the above-mentioned literature, the directions in which windings are wound around their respective tooth portions adjacent to each other are opposite to each other. Thus, the number of poles needs to be increased, which makes it difficult to achieve high speed rotation.

In the present disclosure, a rotating elect c machine capable of high speed rotation is proposed.

The present inventor has conducted intensive studies about a rotating electric machine capable of high speed rotation, and devised the following configuration in order to implement a simply-structured and small-sized rotating electric machine with 2 poles and 12 slots.

Specifically, according to the present disclosure, a rotating electric machine including a stator and a rotor rotatable relative to the stator is proposed. The stator includes: a stator core including a yoke portion having a cylindrical shape and twelve teeth each protruding radially inward from the yoke portion; and coils of three phases, a winding being concentratedly wound around each of the teeth to form each of the coils. The number of poles of the rotor is two. The teeth include two teeth located adjacent to each other in a circumferential direction and forming a teeth portion, and windings of a same phase are respectively wound in a same direction around the two teeth forming the teeth portion and are connected in series. The teeth are arranged such that the teeth portions adjacent to each other are different in phase and the three phases are arranged sequentially side by side in the circumferential direction.

Thereby, a simply-structured and small-sized rotating electric machine having a 2-pole and 12-slot configuration can be implemented. Since the number of poles is two that is the smallest number, the rotating electric machine is capable of high speed rotation.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
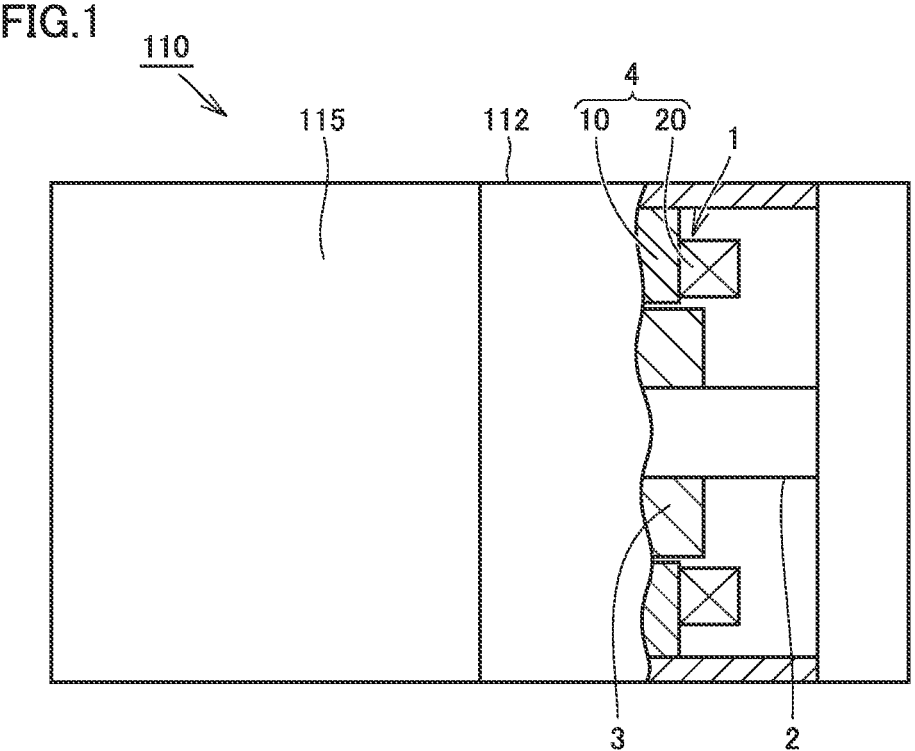
FIG. 1 is a partial cross-sectional view showing a schematic configuration of an electric compressor including a rotating electric machine according to an embodiment.

Embodiments of the present invention will be hereinafter described in detail with reference to the accompanying drawings. In the following description of the embodiments, the same or substantially the same configurations are denoted by the same reference characters, and the description thereof will not be repeated.

FIG. 1 is a partial cross-sectional view showing a schematic configuration of an electric compressor 110 including a rotating electric machine according to an embodiment. The electric compressor 110 is, for example, mounted in a fuel cell electric vehicle and serves as a turbo-type air pump driven by high-speed rotation.

As shown in FIG. 1, the electric compressor 110 includes a housing 112, a compression unit 115, and an electric motor 1.

The electric motor 1 as an example of the rotating electric machine according to the embodiment includes a rotor (a rotator) 3 and a stator 4. The rotor 3 is fixed to a rotation shaft 2. The rotation shaft 2 is rotatably supported inside the housing 112 in the state in which the rotation shaft 2 is inserted through the stator 4. The stator 4 is configured to include a stator core 10 and a coil 20. The stator core 10 is fixed to an inner circumferential surface of the housing 112. The coil 20 is attached to a tooth (described later) of the stator core 10.

When electric power is supplied to the electric motor 1, the rotor 3 and the rotation shaft 2 rotate relative to the stator 4 and the housing 112. This rotation drives the compression unit 115, and thereby, air is supplied to a fuel cell.

Figure 2:
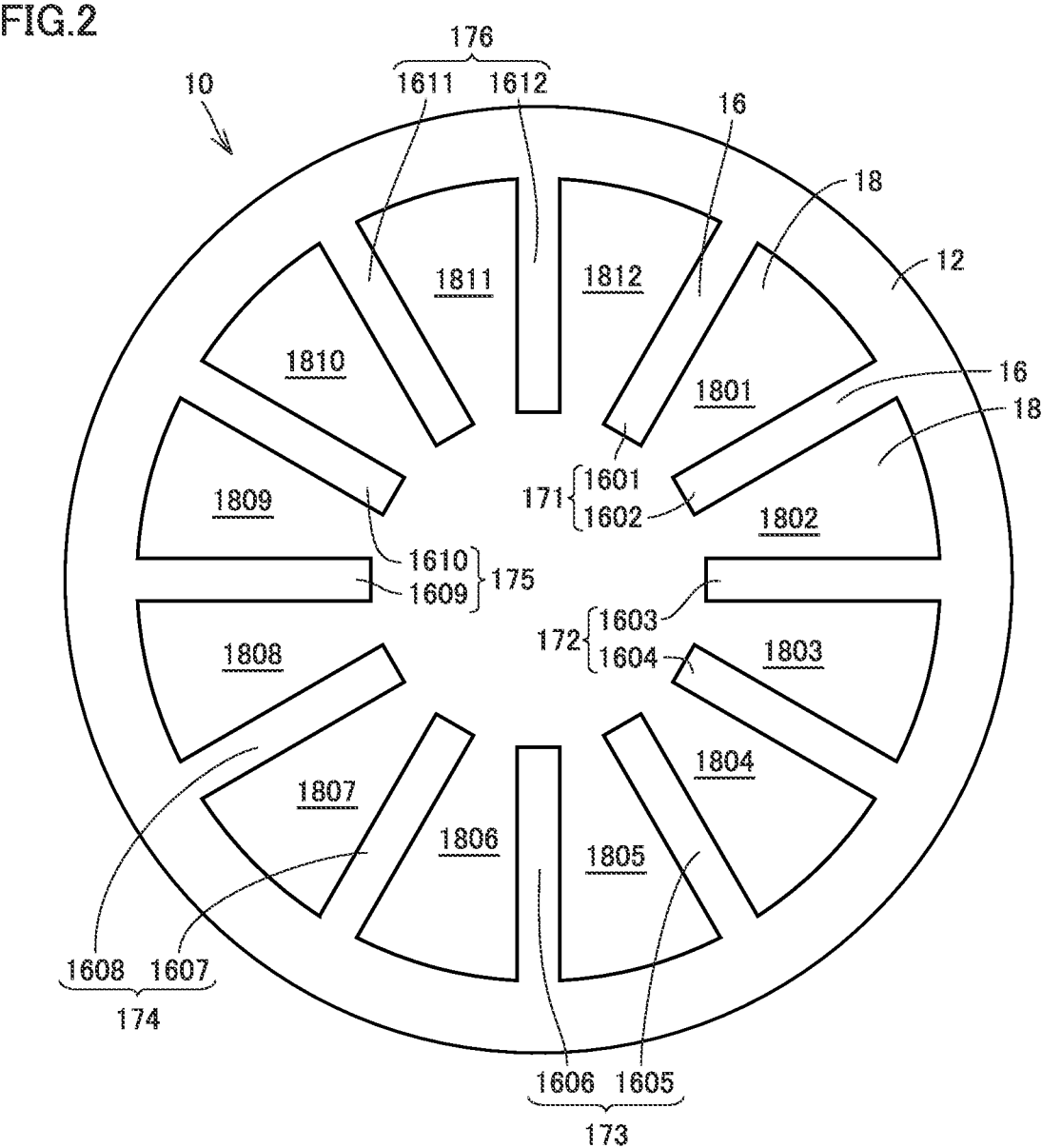
FIG. 2 is a schematic plan view of a stator core.

FIG. 2 is a schematic plan view of the stator core 10. FIG. 2 shows a schematic shape of the stator core 10 when viewed in an axial direction of the electric motor 1 (in the horizontal direction in FIG. 1). The stator core 10 may be formed by stacking a plurality of electromagnetic steel plates each formed in an annular shape, or may be formed from an integral member made of a magnetic material.

As shown in FIG. 2, the stator core 10 entirely has a hollow cylindrical outer shape. In the following description of embodiments, the axial direction of the stator core 10 having a cylindrical shape is simply referred to as an axial direction, the radial direction of the stator core 10 is simply referred to as a radial direction, and the circumferential direction of the stator core 10 is simply referred to as a circumferential direction.

The stator core 10 includes a yoke portion 12 having a cylindrical shape and a plurality of teeth 16. Each of the teeth 16 protrudes radially inward from the inner circumferential surface of the yoke portion 12. The teeth 16 are arranged at intervals in the circumferential direction of the stator core 10. A slot 18 extending in the axial direction is provided between the two teeth 16 adjacent to each other. The stator core 10 in the embodiment includes twelve teeth 16. The number of the slots 18 is also twelve that is the same as the number of the teeth 16.

More specifically, the stator core 10 includes twelve teeth 1601 to 1612. A slot 1801 is provided between the teeth 1601 and 1602 adjacent to each other in the circumferential direction, A slot 1802 is provided between the teeth 1602 and 1603 adjacent to each other in the circumferential direction. A slot 1803 is provided between the teeth 1603 and 1604 adjacent to each other in the circumferential direction. A slot 1804 is provided between the teeth 1604 and 1605 adjacent to each other in the circumferential direction.

A slot 1805 is provided between the teeth 1605 and 1606 adjacent to each other in the circumferential direction. A slot 1806 is provided between the teeth 1606 and 1607 adjacent to each other in the circumferential direction. A slot 1807 is provided between the teeth 1607 and 1608 adjacent to each other in the circumferential direction. A slot 1808 is provided between the teeth 1608 and 1609 adjacent to each other in the circumferential direction.

A slot 1809 is provided between the teeth 1609 and 1610 adjacent to each other in the circumferential direction. A slot 1810 is provided between the teeth 1610 and 1611 adjacent to each other in the circumferential direction. A slot 1811 is provided between the teeth 1611 and 1612 adjacent to each other in the circumferential direction. A slot 1812 is provided between the teeth 1612 and 1601 adjacent to each other in the circumferential direction.

The two teeth 1601 and 1602 adjacent to each other in the circumferential direction form a teeth portion 171. The two teeth 1603 and 1604 adjacent to each other in the circumferential direction form a teeth portion 172. The two teeth 1605 and 1606 adjacent to each other in the circumferential direction form a teeth portion 173. The two teeth 1607 and 1608 adjacent to each other in the circumferential direction form a teeth portion 174. The two teeth 1609 and 1610 adjacent to each other in the circumferential direction form a teeth portion 175. The two teeth 1611 and 1612 adjacent to each other in the circumferential direction form a teeth portion 176.

Figure 3:
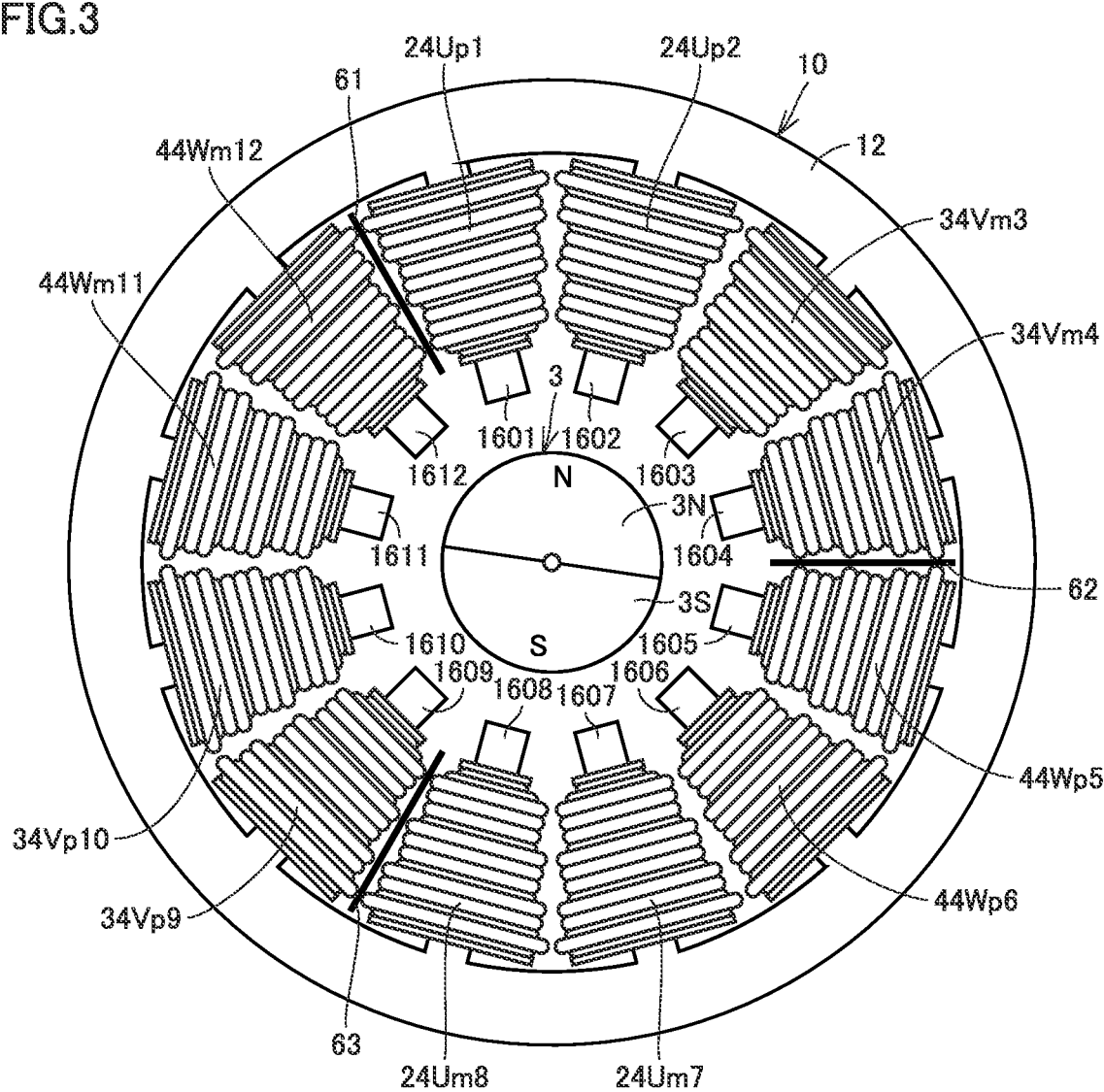
FIG. 3 is a schematic plan view of an electric motor.

FIG. 3 is a schematic plan view of the electric motor 1. Windings are concentratedly wound around their respective twelve teeth 16 to thereby form coils 20 of three phases. The coils 20 of three phases include: a U-phase coil formed by winding a U-phase winding around the tooth 16; a V-phase coil formed by winding a V-phase winding around the tooth 16; and a W-phase coil formed by winding a W-phase winding around the tooth 16. In the present embodiment, twelve coils are arranged side by side in the circumferential direction, and the coils of each phase are constituted of four coils 20.

Specifically, a U-phase coil 24Up1 is attached to the tooth 1601. A U-phase coil 24Up2 is attached to the tooth 1602. The teeth 1601 and 1602 form the teeth portion 171 (FIG. 2), and the windings of the same U-phase are respectively wound around the teeth 1601 and 1602 forming the teeth portion 171 to thereby form a U-phase coil.

A V-phase coil 34Vm3 is attached to the tooth 1603. A V-phase coil 34Vm4 is attached to the tooth 1604. The teeth 1603 and 1604 form the teeth portion 172 (FIG. 2), and the windings of the same V-phase are respectively wound around the teeth 1603 and 1604 forming the teeth portion 172 to thereby form a V-phase coil.

A W-phase coil 44Wp5 is attached to the tooth 1605. A W-phase coil 44Wp6 is attached to the tooth 1606. The teeth 1605 and 1606 form the teeth portion 173 (FIG. 2), and the windings of the same W-phase are respectively wound around the teeth 1605 and 1606 forming the teeth portion 173 to thereby form a W-phase coil.

A U-phase coil 24Um7 is attached to the tooth 1607. A U-phase coil 24Um8 is attached to the tooth 1608. The teeth 1607 and 1608 form the teeth portion 174 (FIG. 2), and the windings of the same U-phase are respectively wound around the teeth 1607 and 1608 forming the teeth portion 174 to thereby form a U-phase coil.

A V-phase coil 34Vp9 is attached to the tooth 1609, A V-phase coil 34Vp10 is attached to the tooth 1610. The teeth 1609 and 1610 form the teeth portion 175 (FIG. 2), and the windings of the same V-phase are respectively wound around the teeth 1609 and 1610 forming the teeth portion 175 to thereby form a V-phase coil.

A W-phase coil 44Wm11 is attached to the tooth 1611. A W-phase coil 44Wm12 is attached to the tooth 1612. The teeth 1611 and 1612 form the teeth portion 176 (FIG. 2), and the windings of the same W-phase are respectively wound around the teeth 1611 and 1612 forming the teeth portion 176 to thereby form a W-phase coil.

U-phase windings are respectively wound around the two adjoining teeth 16 to thereby form two U-phase coils. For example, the U-phase coils 24Up1 and 24Up2 are attached to the adjoining teeth 1601 and 1602, respectively, that form the teeth portion 171. V-phase windings are respectively wound around two teeth 16 adjacent to the two teeth 16 each having the U-phase coil attached thereto, to thereby form two V-phase coils. For example, the V-phase coils 34Vm3 and 34Vm4 are attached to the teeth 1603 and 1604, respectively, that form the teeth portion 172 adjacent to the teeth portion 171.

W-phase windings are respectively wound around the teeth 16 that are adjacent to the two teeth 16 each having the U-phase winding wound therearound and that are opposite to the V-phase coils, to thereby form W-phase coils. For example, the W-phase coils 44Wm11 and 44Wm12 are attached to the teeth 1611 and 1612, respectively, that form the teeth portion 176 on the side opposite to the teeth portion 172 having the V-phase coil attached thereto, with respect to the teeth portion 171.

The teeth 16 are arranged such that the adjoining teeth portions are different in phase and three phases are arranged sequentially side by side in the circumferential direction. The coils of three phases are arranged side by side in order of coils of the first phase, coils of the second phase, and coils of the third phase so as to correspond to the six teeth portions 171 to 176 arranged sequentially in the circumferential direction. A U-phase coil is attached to the teeth portion 171. A V-phase coil is attached to the teeth portion 172 adjacent to the teeth portion 171. A W-phase coil is attached to the teeth portion 173 adjacent to the teeth portion 172. A U-phase coil is attached to the teeth portion 174 adjacent to the teeth portion 173. A V-phase coil is attached to the teeth portion 175 adjacent to the teeth portion 174. A W-phase coil is attached to the teeth portion 176 adjacent to the teeth portion 175.

The U-phase coil 24Up1 and the W-phase coil 44Wm12 are adjacent to each other in the circumferential direction, and interphase insulation paper 61 is disposed between the U-phase winding forming the U-phase coil 24Up1 and the W-phase winding forming the W-phase coil 44Wm12. The interphase insulation paper 61 is an example of an interphase insulator and provides insulation between the U-phase winding forming the U-phase coil 24Up1 and the W-phase winding forming the W-phase coil 44Wm12.

Interphase insulation paper 62 is disposed between the V-phase winding forming the V-phase coil 34Vm4 and the W-phase winding forming the W-phase coil 44Wp5. The interphase insulation paper 62 provides insulation between the V-phase winding forming the V-phase coil 34Vm4 and the W-phase winding forming the W-phase coil 44Wp5. Interphase insulation paper 63 is disposed between the U-phase winding forming the U-phase coil 24Um8 and the V-phase winding forming the V-phase coil 34Vp9. The interphase insulation paper 63 provides insulation between the U-phase winding forming the U-phase coil 24Um8 and the V-phase winding forming the V-phase coil 34Vp9.

As shown in FIG. 3, the rotor 3 has an N-pole core portion 3N and an S-pole core portion 3S, and the number of poles of the rotor 3 is two. The rotor 3 may be an interior permanent magnet (IPM)-type rotor in which a permanent magnet is embedded in each core portion, or may be a surface permanent magnet (SPM)-type rotor in which a magnet is attached to the surface of each core portion.

Figure 4:
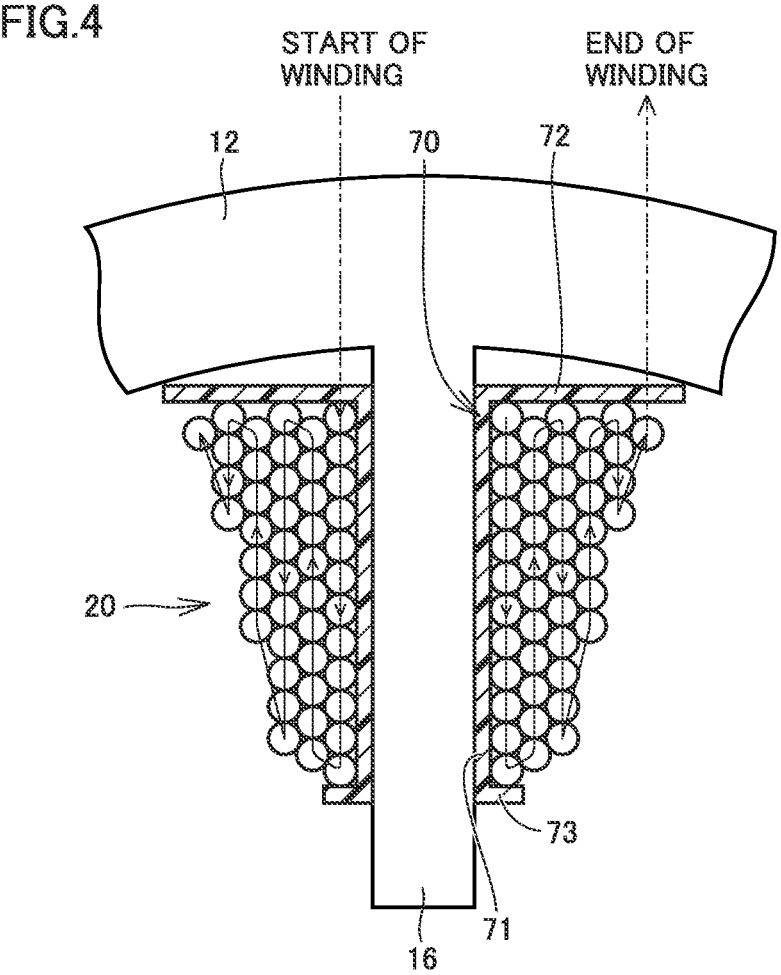
FIG. 4 is a schematic diagram showing a winding wound around a tooth.

FIG. 4 is a schematic diagram showing a winding wound around the tooth 16. As shown in FIG. 4, a bobbin 70 is attached to the tooth 16. The bobbin 70 is made of an insulating material typified by resin. The bobbin 70 is disposed to surround the outer circumference of the tooth 16. The winding forming the coil 20 is wound around the bobbin 70 in a stacked manner. The bobbin 70 is an insulation member that electrically insulates the stator core 10 from the coil 20. The bobbin 70 includes a winding-wound portion 71, a first flange portion 72, and a second flange portion 73.

The winding-wound portion 71 has a cylindrical shape and extends in the radial Ill direction. The bobbin 70 is moved relative to the stator core 10 such that the tooth 16 is inserted into the winding-wound portion 71, and thereby, the bobbin 70 is attached to the stator core 10. The inner circumferential surface of the winding-wound portion 71 faces the tooth 16. The inner circumferential surface of the winding-wound portion 71 is in contact with the tooth 16. The winding is wound along the outer circumferential surface of the winding-wound portion 71 in a stacked manner.

The first flange portion 72 is provided at a radially outside end of the winding-wound portion 71 and extends in the circumferential direction and the axial direction. The first flange portion 72 is in contact with the inner circumferential surface of the yoke portion 12. The second flange portion 73 is provided at a radially inside end of the winding-wound portion 71 and extends in the circumferential direction and the axial direction.

As shown in FIG. 4, the winding at the start of winding is guided to a position at which the winding comes into contact with the winding-wound portion 71 and also into contact with the first flange portion 72, and then, wound around the winding-wound portion 71. The winding is wound around the winding-wound portion 71 while being directed radially inward (downward in FIG. 4). When the winding reaches the second flange portion 73, the winding is folded back to become a second layer, and then wound around the winding of the first layer while being directed radially outward (upward in FIG. 4).

Similarly, the winding of the third layer is wound around the winding of the second layer while being directed radially inward, the winding of the fourth layer is wound around the winding of the third layer while being directed radially outward, and the winding of the fifth layer is wound around the winding of the fourth layer while being directed radially inward. The winding of the sixth layer is wound around the winding of the fifth layer in the vicinity of the first flange portion 72, and then, the operation of winding is ended.

The winding of the second layer is located farther away from the tooth 16 than the winding of the first layer. The winding of third layer is located farther away from the tooth 16 than the winding of the second layer. The winding of the sixth layer at the end of winding is farthest from the tooth 16. The winding becomes farther away from the tooth 16 from the start to the end of winding around the tooth 16. A power feed-side leading wire (described later) extends from the innermost diameter side of the winding wound around the tooth 16 in a layered manner. A neutral point-side leading wire (described later) extends from the outermost diameter side of the winding wound around the tooth 16 in a layered manner.

FIG. 4 exemplarily shows a winding wound in six layers around the bobbin 70. The number of layers of the winding wound around the bobbin 70 may be five or less, or may be seven or more. The number of windings in each layer disposed between the first flange portion 72 and the second flange portion 73 may also be any number.

Figure 5:
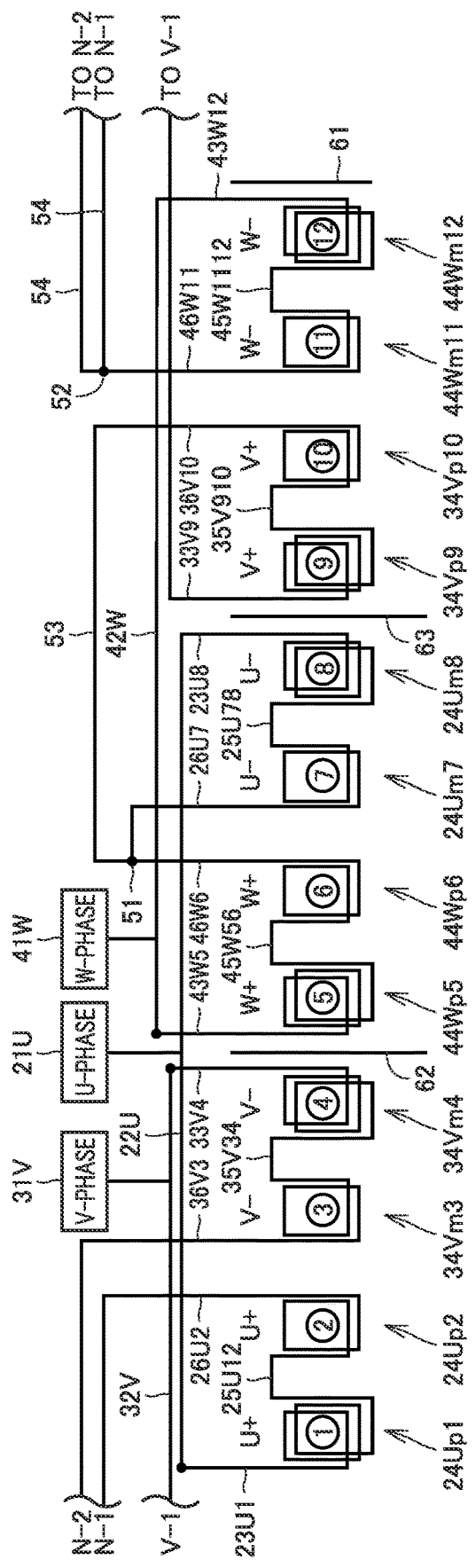
FIG. 5 is a line connection diagram of a stator.

FIG. 5 is a line connection diagram of the stator 4. A U-phase input terminal 21U, a V-phase input terminal 31V, and a W-phase input terminal 41W each are electrically connected to an inverter (not shown). Alternating-current (AC) power of three phases is input to the U-phase input terminal 21U, the V-phase input terminal 31V, and the W-phase input terminal 41W.

A U-phase power feed conductor 22U is connected to the U-phase input terminal 21U. A U-phase power feed-side leading wire 23U1 extends from a tip end of winding start of the U-phase coil 24Up1, and is connected to the U-phase power feed conductor 22U. The U-phase input terminal 21U, the U-phase power feed conductor 22U, and the U-phase power feed-side leading wire 23U1 form a power feed path that leads to the U-phase coils 24Up1 and 24Up2.

When the U-phase coils 24Up1 and 24Up2 are viewed in the same direction, winding directions of the windings are the same. The U-phase winding forming the U-phase coil 24Up1 shown in FIG. 5 is wound around the tooth 1601 (FIGS. 2 and 3) in a counterclockwise direction, and the U-phase winding forming the U-phase coil 24Up2 is wound around the tooth 1602 in the counterclockwise direction. The windings of the same U-phase are wound in the same direction around the teeth 1601 and 1602 adjacent to each other in the circumferential direction.

A U-phase crossover conductor 25U12 is connected to the U-phase coils 24Up1 and 24Up2. The U-phase crossover conductor 25U12 electrically connects a tip end of the winding end of the U-phase coil 24Up1 and a tip end of the winding start of the U-phase coil 24Up2 to each other. The U-phase coils 24Up1 and 24Up2 adjacent to each other in the circumferential direction are connected in series via the U-phase crossover conductor 25U12. The U-phase crossover conductor 25U12 may be disposed radially outside of the first flange portion 72 of the bobbin 70 or may be disposed radially inside of the first flange portion 72.

A U-phase neutral point-side leading wire 26U2 extends from a tip end of the winding end of the U-phase coil 24Up2, and is connected to a neutral point 52 via a neutral conductor 54. The neutral conductor 54 electrically connects the U-phase coil 24Up2 to the neutral point 52.

A U-phase power feed-side leading wire 23U8 extends from a tip end of the winding start of the U-phase coil 24Um8, and is connected to the U-phase power feed conductor 22U. The U-phase input terminal 21U, the U-phase power feed conductor 22U, and the U-phase power feed-side leading wire 23U8 form a power feed path that leads to the U-phase coils 24Um8 and 24Um7.

When the U-phase coils 24Um8 and 24Um7 are viewed in the same direction, winding directions of the windings are the same. The U-phase winding forming the U-phase coil 24Um8 shown in FIG. 5 is wound around the tooth 1608 in a clockwise direction, and the U-phase winding forming the U-phase coil 24Um7 is wound around the tooth 1607 in the clockwise direction. The windings of the same U-phase are wound in the same direction around the teeth 1607 and 1608 adjacent to each other in the circumferential direction.

A U-phase crossover conductor 25U78 is connected to the U-phase coils 24Um7 and 24Um8. The U-phase crossover conductor 25U78 electrically connects a tip end of the winding end of the U-phase coil 24Um8 and a tip end of the winding start of the U-phase coil 24Um7 to each other. The U-phase coils 24Um7 and 24Um8 adjacent to each other in the circumferential direction are connected in series via the U-phase crossover conductor 25U78. The U-phase crossover conductor 25U78 may be disposed radially outside of the first flange portion 72 of the bobbin 70 or may be disposed radially inside of the first flange portion 72.

A U-phase neutral point-side leading wire 26U7 extends from a tip end of the winding end of the U-phase coil 24Um7. The U-phase neutral point-side leading wire 26U7 is connected to a neutral point 51.

A V-phase power feed conductor 32V is connected to the V-phase input terminal 31V. A V-phase power feed-side leading wire 33V4 extends from a tip end of the winding start of the V-phase coil 34Vm4, and is connected to the V-phase power feed conductor 32V. The V-phase input terminal 31V, the V-phase power feed conductor 32V, and the V-phase power feed-side leading wire 33V4 form a power feed path that leads to the V-phase coils 34Vm4 and 34Vm3.

When the V-phase coils 34Vm4 and 34Vm3 are viewed in the same direction, winding directions of the windings are the same. The V-phase winding forming the V-phase coil 34Vm4 shown in FIG. 5 is wound around the tooth 1604 in the clockwise direction, and the V-phase winding forming the V-phase coil 34Vm3 is wound around the tooth 1603 in the clockwise direction. The windings of the same V-phase are wound in the same direction around the teeth 1603 and 1604 adjacent to each other in the circumferential direction.

A V-phase crossover conductor 35V34 is connected to the V-phase coils 34Vm3 and 34Vm4. The V-phase crossover conductor 35V34 electrically connects a tip end of the winding end of the V-phase coil 34Vm4 and a tip end of the winding start of the V-phase coil 34Vm3 to each other. The V-phase coils 34Vm3 and 34Vm4 adjacent to each other in the circumferential direction are connected in series via the V-phase crossover conductor 35V34. The V-phase crossover conductor 35V34 may be disposed radially outside of the first flange portion 72 of the bobbin 70 or may be disposed radially inside of the first flange portion 72.

A V-phase neutral point-side leading wire 36V3 extends from a tip end of the winding end of the V-phase coil 34Vm3. The V-phase neutral point-side leading wire 36V3 is connected to the neutral point 52 via the neutral conductor 54. The neutral conductor 54 electrically connects the V-phase coil 34Vm3 to the neutral point 52.

A V-phase power feed-side leading wire 33V9 extends from a tip end of the winding start of the V-phase coil 34Vp9, and is connected to the V-phase power feed conductor 32V. The V-phase input terminal 31V, the V-phase power feed conductor 32V, and the V-phase power feed-side leading wire 33V9 form a power feed path that leads to the V-phase coils 34Vp9 and 34Vp10.

When the V-phase coils 34Vp9 and 34Vp10 are viewed in the same direction, winding directions of the windings are the same. The V-phase winding forming the V-phase coil 34Vp9 shown in FIG. 5 is wound around the tooth 1609 in the counterclockwise direction, and the V-phase winding forming the V-phase coil 34Vp10 is wound around the tooth 1610 in the counterclockwise direction. The windings of the same V-phase are wound in the same direction around the teeth 1609 and 1610 adjacent to each other in the circumferential direction.

A V-phase crossover conductor 35V910 is connected to the V-phase coils 34Vp9 and 34Vp10. The V-phase crossover conductor 35V910 electrically connects a tip end of the winding end of the V-phase coil 34Vp9 and a tip end of the winding start of the V-phase coil 34Vp10 to each other. The V-phase coils 34Vp9 and 34Vp10 adjacent to each other in the circumferential direction are connected in series via the V-phase crossover conductor 35V910. The V-phase crossover conductor 35V910 may be disposed radially outside of the first flange portion 72 of the bobbin 70 or may be disposed radially inside of the first flange portion 72.

A V-phase neutral point-side leading wire 36V10 extends from a tip end of the winding end of the V-phase coil 34Vp10. The V-phase neutral point-side leading wire 36V10 is connected to the neutral point 51 via a neutral conductor 53. The neutral conductor 53 is a member separate from the neutral conductor 54. The neutral conductor 53 electrically connects the V-phase coil 34Vp10 to the neutral point 51.

A W-phase power feed conductor 42W is connected to the W-phase input terminal 41W. A W-phase power feed-side leading wire 43W5 extends from a tip end of the winding start of the W-phase coil 44Wp5, and is connected to the W-phase power feed conductor 42W. The W-phase input terminal 41W, the W-phase, power feed conductor 42W, and the W-phase power feed-side leading wire 43W5 form a power feed path that leads to the W-phase coils 44Wp5 and 44Wp6.

When the W-phase coils 44Wp5 and 44Wp6 are viewed in the same direction, winding directions of the windings are the same. The W-phase winding forming the W-phase coil 44Wp5 shown in FIG. 5 is wound around the tooth 1605 in the counterclockwise direction, and the W-phase winding forming the W-phase coil 44Wp6 is wound around the tooth 1606 in the counterclockwise direction. The windings of the same W-phase are wound in the same direction around the teeth 1605 and 1606 adjacent to each other in the circumferential direction.

A W-phase crossover conductor 45W56 is connected to the W-phase coils 44Wp5 and 44Wp6. The W-phase crossover conductor 45W56 electrically connects a tip end of the winding end of the W-phase coil 44Wp5 and a tip end of the winding start of the W-phase coil 44Wp6 to each other. The W-phase coils 44Wp5 and 44Wp6 adjacent to each other in the circumferential direction are connected in series via the W-phase crossover conductor 45W56. The W-phase crossover conductor 45W56 may be disposed radially outside of the first flange portion 72 of the bobbin 70 or may be disposed radially inside of the first flange portion 72.

A W-phase neutral point-side leading wire 46W6 extends from a tip end of the winding end of the W-phase coil 44Wp6. The W-phase neutral point-side leading wire 46W6 is connected to the neutral point 51.

A W-phase power feed-side leading wire 43W12 extends from a tip end of the winding start of the W-phase coil 44Wm12, and is connected to the W-phase power feed conductor 42W. The W-phase input terminal 41W, the W-phase power feed conductor 42W, and the W-phase power feed-side leading wire 43W12 form a power feed path that leads to the W-phase coils 44Wm12 and 44Wm11.

When the W-phase coils 44Wm12 and 44Wm11 are viewed in the same direction, winding directions of the windings are the same. The W-phase winding forming the W-phase coil 44Wm12 shown in FIG. 5 is wound around the tooth 1612 in the clockwise direction, and the W-phase winding forming the W-phase coil 44Wm11 is wound around the tooth 1611 in the clockwise direction. The windings of the same W-phase are wound in the same direction around the teeth 1611 and 1612 adjacent to each other in the circumferential direction.

A W-phase crossover conductor 45W1112 is connected to the W-phase coils 44Wm11 and 44Wm12. The W-phase crossover conductor 45W1112 electrically connects a tip end of the winding end of the W-phase coil 44Wm12 and a tip end of the winding start of the W-phase coil 44Wm11 to each other. The W-phase coils 44Wm11 and 44Wm12 adjacent to each other in the circumferential direction are connected in series via the W-phase crossover conductor 45W1112. The W-phase crossover conductor 45W1112 may be disposed radially outside of the first flange portion 72 of the bobbin 70 or may be disposed radially inside of the first flange portion 72.

A W-phase neutral point-side leading wire 46W11 extends from a tip end of the winding end of the W-phase coil 44Wm11. The W-phase neutral point-side leading wire 46W11 is connected to the neutral point 52.

In FIG. 5, plus and minus signs indicate directions in which windings are wound around their respective teeth 16. Each of the U-phase coils 24Up1 and 24Up2, the V-phase coils 34Vp9 and 34Vp10, and the W-phase coils 44Wp5 and 44Wp6 is formed as a winding is wound around the tooth 16 in a counterclockwise direction in FIG. 5. Each of the U-phase coils 24Um7 and 24Um8, the V-phase coils 34Vm3 and 34Vm4, and the W-phase coils 44Wm11 and 44Wm12 is formed as a winding is wound around the tooth 16 in a clockwise direction in FIG. 5.

A U-phase current flows through the U-phase coils 24Up1 and 24Up2. In the current flowing direction, the U-phase coil 24Up1 is located on the upstream side and the U-phase coil 24Up2 is located on the downstream side. The U-phase power feed-side leading wire 23U1 connected to the U-phase input terminal 21U extends from the U-phase coil 24Up1 on the upstream side. The U-phase neutral point-side leading wire 26U2 leading to the neutral point 52 extends from the U-phase coil 24Up2 on the downstream side.

A V-phase current flows through the V-phase coils 34Vm3 and 34Vm4. In the current flowing direction, the V-phase coil 34Vm4 is located on the upstream side and the V-phase coil 34Vm3 is located on the downstream side. The V-phase power feed-side leading wire 33V4 connected to the V-phase input terminal 31V extends from the V-phase coil 34Vm4 on the upstream side. The V-phase neutral point-side leading wire 36V3 leading to the neutral point 52 extends from the V-phase coil 34Vm3 on the downstream side.

The U-phase coil 24Up2 from which the U-phase neutral point-side leading wire 26U2 extends is attached to the tooth 1602. The V-phase coil 34Vm3 from which the V-phase neutral point-side leading wire 36V3 extends is attached to the tooth 1603. The U-phase coil 24Up2 and the V-phase coil 34Vm3 are respectively attached to the two teeth 16 adjacent to each other in the circumferential direction. No interphase insulation paper is disposed between the U-phase winding forming the U-coil 24Up2 and the V-phase winding forming the V-phase coil 34Vm3.

A W-phase current flows through the W-phase coils 44Wp5 and 44Wp6. In the current flowing direction, the W-phase coil 44Wp5 is located on the upstream side and the W-phase coil 44Wp6 is located on the downstream side. The W-phase power feed-side leading wire 43W5 connected to the W-phase input terminal 41W extends from the W-phase coil 44Wp5 on the upstream side. The W-phase neutral point-side leading wire 46W6 leading to the neutral point 51 extends from the W-phase coil 44Wp6 on the downstream side.

U-phase windings are respectively wound around the two teeth 1601 and 1602 adjacent to the teeth 1603 and 1604 around which the V-phase windings are wound, and thereby, the U-phase coils 24Up1 and 24Up2 are formed. W-phase windings are respectively wound around the two teeth 1605 and 1606 adjacent to the teeth 1603 and 1604 on the side opposite to the U-phase coils 24Up1 and 24Up2, and thereby, the W-phase coils 44Wp5 and 44Wp6 are formed. The interphase insulation paper 62 is disposed between the V-phase coil 34Vm4 and the W-phase coil 44Wp5. The interphase insulation paper 62 electrically insulates the V-phase winding forming the V-phase coil 34Vm4 from the W-phase winding forming the W-phase coil 44Wp5.

A U-phase current flows through the U-phase coils 24Um7 and 24Um8. In the current flowing direction, the U-phase coil 24Um8 is located on the upstream side and the U-phase coil 24Um7 is located on the downstream side. The U-phase power feed-side leading wire 23U8 connected to the U-phase input terminal 21U extends from the U-phase coil 24Um8 on the upstream side. The U-phase neutral point-side leading wire 26U7 leading to the neutral point 51 extends from the U-phase coil 24Um7 on the downstream side.

The W-phase coil 44Wp6 from which the W-phase neutral point-side leading wire 46W6 extends is attached to the tooth 1606. The U-phase coil 24Um7 from which the U-phase neutral point-side leading wire 26U7 extends is attached to the tooth 1607. The W-phase coil 44Wp6 and the U-phase coil 24Um7 are respectively attached to the two teeth 16 adjacent to each other in the circumferential direction. No interphase insulation paper is disposed between the W-phase winding forming the W-phase coil 44Wp6 and the U-phase winding forming the U-phase coil 24Um7.

A V-phase current flows through the V-phase coils 34Vp9 and 34Vp10. In the current flowing direction, the V-phase coil 34Vp9 is located on the upstream side and the V-phase coil 34Vp10 is located on the downstream side. The V-phase power feed-side leading wire 33V9 connected to the V-phase input terminal 31V extends from the V-phase coil 34Vp9 on the upstream side. The V-phase neutral point-side leading wire 36V10 leading to the neutral point 51 extends from the V-phase coil 34Vp10 on the downstream side.

W-phase windings are respectively wound around the two teeth 1605 and 1606 adjacent to the teeth 1607 and 1608 around Which the U-phase windings are wound, and thereby, the W-phase coils 44Wp5 and 44Wp6 are formed. V-phase windings are respectively wound around the two teeth 1609 and 1610 adjacent to the teeth 1607 and 1608 on the side opposite to the W-phase coils 44Wp5 and 44Wp6, and thereby, the V-phase coils 34Vp9 and 34Vp10 are formed. The interphase insulation paper 63 is disposed between the U-phase coil 24Um8 and the V-phase coil 34Vp9. The interphase insulation paper 63 electrically insulates the U-phase winding forming the U-phase coil 24Um8 from the V-phase winding forming the V-phase coil 34Vp9.

A W-phase current flows through the W-phase coils 44Wm11 and 44Wm12. In the current flowing direction, the W-phase coil 44Wm12 is located on the upstream side and the W-phase coil 44Wm11 is located on the downstream side. The W-phase power feed-side leading wire 43W12 connected to the W-phase input terminal 41W extends from the W-phase coil 44Wm12 on the upstream side. The W-phase neutral point-side leading wire 46W11 leading to the neutral point 52 extends from the W-phase coil 44Wm11 on the downstream side.

The V-phase coil 34Vp10 from which the V-phase neutral point-side leading wire 36V10 extends is attached to the tooth 1610. The W-phase coil 44Wm11 from which the W-phase neutral point-side leading wire 46W11 extends is attached to the tooth 1611. The V-phase coil 34Vp10 and the W-phase coil 44Wm11 are respectively attached to the two teeth 16 adjacent to each other in the circumferential direction. No interphase insulation paper is disposed between the V-phase winding forming the V-phase coil 34Vp10 and the W-phase winding forming the W-phase coil 44Wm11.

V-phase windings are respectively wound around the two teeth 1609 and 1610 adjacent to the teeth 1611 and 1612 around Which the W-phase windings are wound, and thereby, the V-phase coils 34Vp9 and 34Vp10 are formed. U-phase windings are respectively wound around the two teeth 1601 and 1602 (see FIGS. 2 and 3) adjacent to the teeth 1611 and 1612 on the side opposite to the V-phase coils 34Vp9 and 34Vp10, and thereby, the U-phase coils 24Up1 and 24Up2 are formed. The interphase insulation paper 61 is disposed between the W-phase coil 44Wm12 and the U-phase coil 24Up1. The interphase insulation paper 61 electrically insulates the W-phase winding forming the NV-phase coil 44Wm12 from the U-phase winding forming the U-phase coil 24Up1.

In each of the U-phase coils 24Up1 and 24Up2, the V-phase coils 34Vp9 and 34Vp10, and the W-phase coils 44Wp5 and 44Wp6, each of which is formed by a winding wound around the tooth 16 in a counterclockwise direction in FIG. 5, each of the coils 20 on the upstream side in the current flowing direction is disposed on the left side in FIG. 5 (on the counterclockwise side in FIGS. 2 and 3). In each of the U-phase coils 24Um7 and 24Um8, the V-phase coils 34Vm3 and 34Vm4, and the W-phase coils 44Wm11 and 44Wm12, each of which is formed by a winding wound around the tooth 16 in a clockwise direction in FIG. 5, each of the coils 20 on the upstream side in the current flowing direction is disposed on the right side in FIG. 5 (on the clockwise side in FIGS. 2 and 3).

The U-phase neutral point-side leading wire 26U7 extending from the U-phase coil 24Um7, the V-phase neutral point-side leading wire 36V10 extending from the V-phase coil 34Vp10, and the W-phase neutral point-side leading wire 46W6 extending from the W-phase coil 44Wp6 are electrically connected at the neutral point 51. The U-phase neutral point-side leading wire 26U2 extending from the U-phase coil 24Up2, the V-phase neutral point-side leading wire 36V3 extending from the V-phase coil 34Vm3, and the W-phase neutral point-side leading wire 46W11 extending from the W-phase coil 44Wm11 are electrically connected at the neutral point 52.

The neutral points 51 and 52 have the same electrical potential. The neutral points 51 and 52 are grounded and have the same zero electrical potential. The potential difference between the neutral points 51 and 52 is kept at substantially zero.

Figure 6:
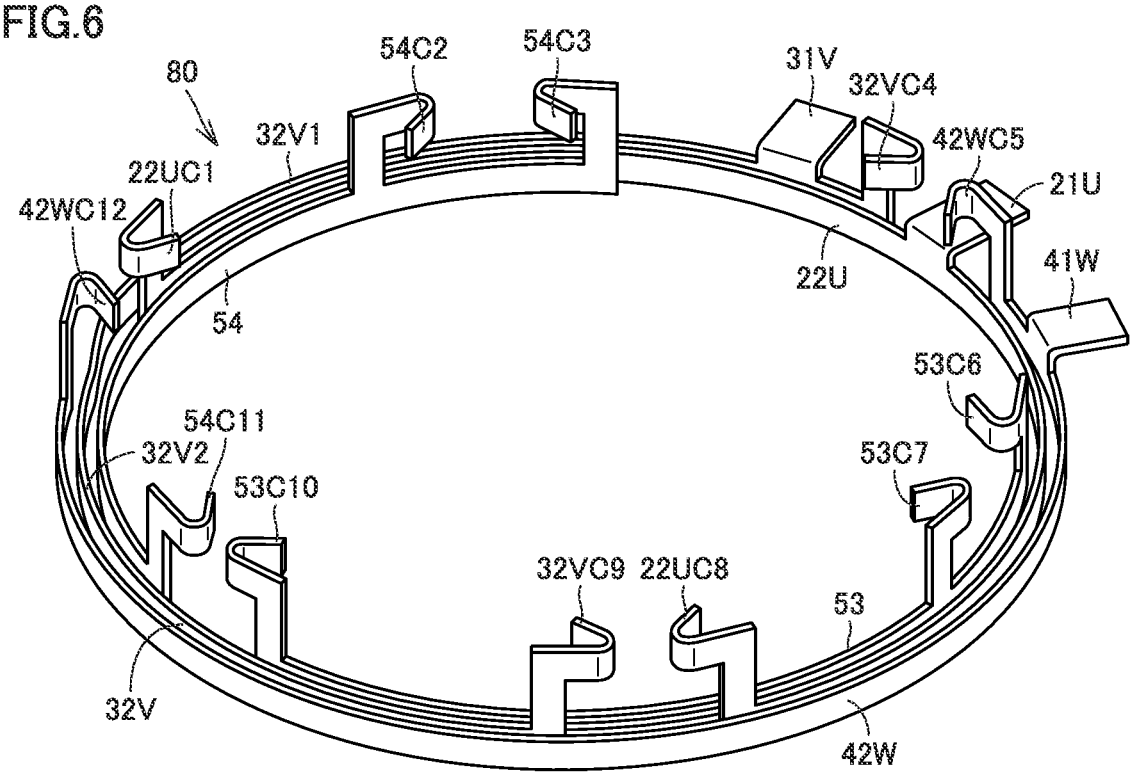
FIG. 6 is a perspective view of an annular bus bar.
Figure 7:
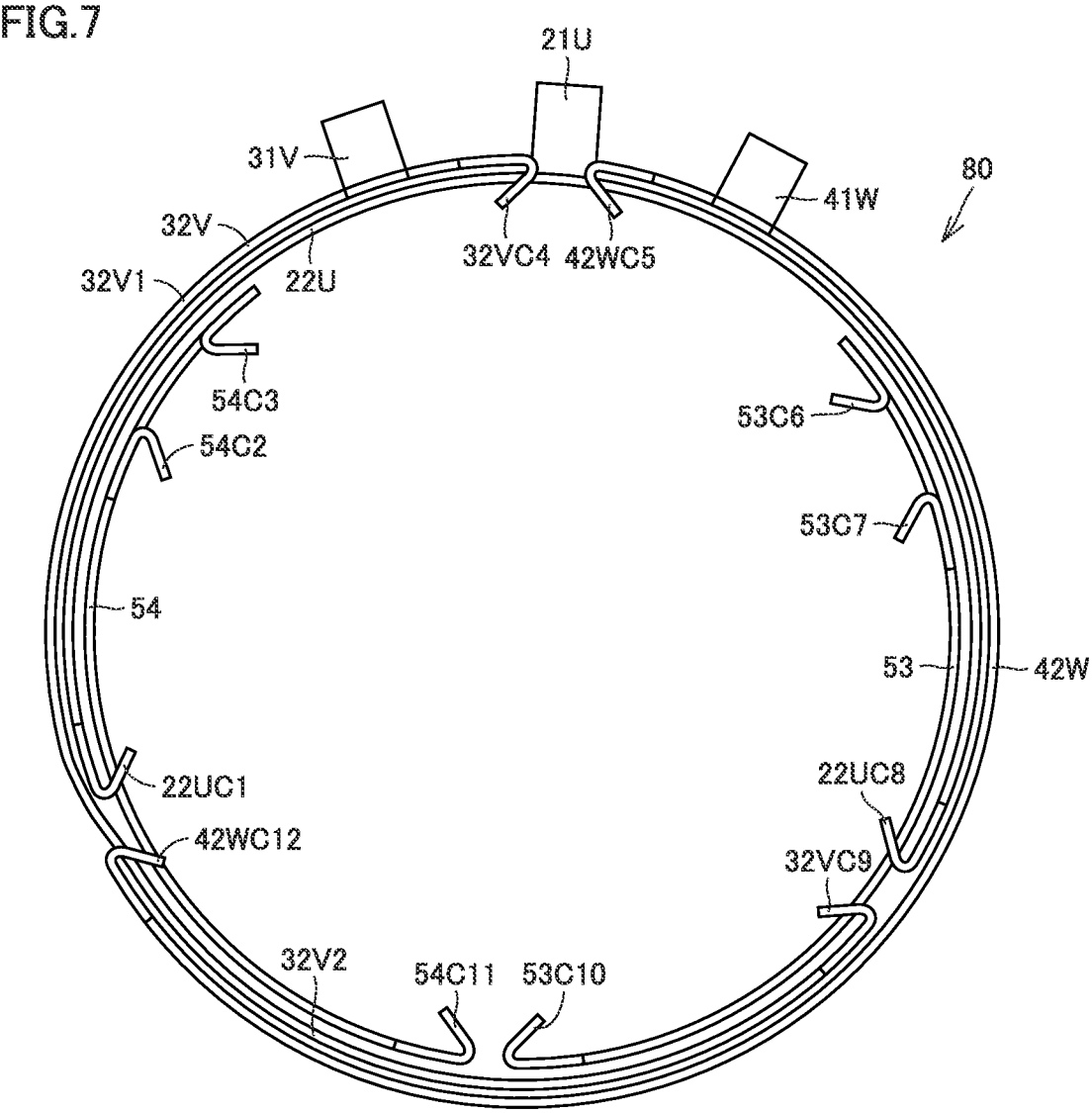
FIG. 7 is a schematic plan view of the annular bus bar.

Each of the U-phase power feed conductor 22U, the V-phase power feed conductor 32V, the W-phase power feed conductor 42W, and the neutral conductors 53 and 54 shown in FIG. 5 may be formed of a winding or a bus bar. FIG. 6 is a perspective view of an annular bus bar 80. FIG. 7 is a schematic plan view of the annular bus bar 80.

As shown in FIGS. 6 and 7, each of the U-phase power feed conductor 22U, the V-phase power feed conductor 32V, the W-phase power feed conductor 42W, and the neutral conductors 53 and 54 is configured by a bus bar having a substantially arc shape in a plan view. These bus bars are arranged to form the annular bus bar 80 having a substantially annular shape in a plan view. The U-phase power feed conductor 22U, the V-phase power feed conductor 32V, the W-phase power feed conductor 42W, and the neutral conductors 53 and 54 are disposed with a gap interposed between the respective conductors.

Figure 8:
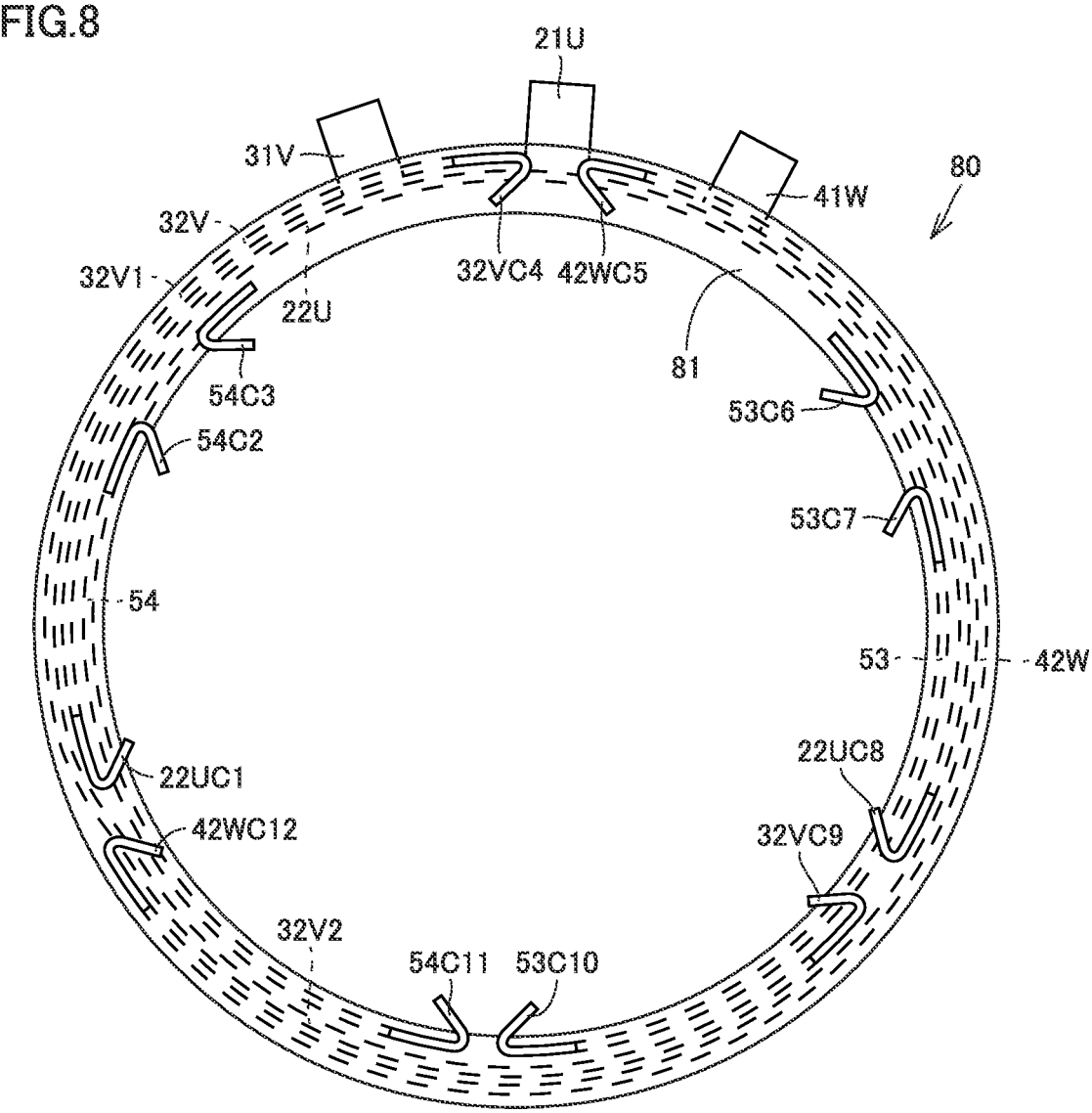
FIG. 8 is a schematic diagram showing a resin covering the annular bus bar.

FIG. 8 is a schematic diagram showing a resin 81 covering the annular bus bar 80. Each of the conductors shown in FIG. 7 has a portion covered with the resin 81, which is indicated by a broken line in FIG. 8. The U-phase power feed conductor 22U, the V-phase power feed conductor 32V, the W-phase power feed conductor 42W, and the neutral conductors 53 and 54 are integrated by the resin 81 having an annular shape. The resin 81 ensures insulation between the U-phase power feed conductor 22U, the V-phase power feed conductor 32V, the W-phase power feed conductor 42W, and the neutral conductors 53 and 54. The resin 81 also has a function of positioning the U-phase power feed conductor 22U, the V-phase power feed conductor 32V, the W-phase power feed conductor 42W, and the neutral conductors 53 and 54.

In the annular bus bar 80, the neutral conductors 53 and 54 are disposed on the radially innermost side. The neutral conductors 53 and 54 have the same curvature and are concentrically arranged. The U-phase power feed conductor 22U is smaller in curvature than the neutral conductors 53 and 54, and disposed radially outside of the neutral conductors 53 and 54. The W-phase power feed conductor 42W is smaller in curvature than the U-phase power feed conductor 22U, and disposed radially outside of the U-phase power feed conductor 22U.

The V-phase power feed conductor 32V includes a first portion 32V1 disposed radially outside of the U-phase power feed conductor 22U and a second portion 32V2 disposed radially inside of the W-phase power feed conductor 42W. The second portion 32V2 is disposed between the W-phase power feed conductor 42W and the neutral conductors 53, 54 in the radial direction.

The first portion 32V1 of the V-phase power feed conductor 32V and the W-phase power feed conductor 42W have the same curvature and are concentrically arranged. The second portion 32V2 of the V-phase power feed conductor 32V and the U-phase power feed conductor 22U have the same curvature and are concentrically arranged. At a portion where the first portion 32V1 and the second portion 32V2 are connected to each other, the position of the V-phase power feed conductor 32V changes in the radial direction. The first portion 32V1 is disposed radially outside of the second portion 32V2. The first portion 32V1 is smaller in curvature than the second portion 32V2.

The U-phase input terminal 21U is formed integrally with the U-phase power feed conductor 22U and extends radially outward from an arc-shaped portion of the U-phase power feed conductor 22U. The V-phase input terminal 31V is formed integrally with the V-phase power feed conductor 32V and extends radially outward from an arc-shaped portion of the V-phase power feed conductor 32V. The W-phase input terminal 41W is formed integrally with the W-phase power feed conductor 42W and extends radially outward from an arc-shaped portion of the W-phase power feed conductor 42W.

The U-phase power feed conductor 22U, the V-phase power feed conductor 32V, the W-phase power feed conductor 42W, and the neutral conductors 53 and 54 that form the annular bus bar 80 are arranged side by side at intervals in the radial direction. At any position in the circumferential direction of the annular bus bar 80, the number of conductors located at the same position in the circumferential direction and arranged in the radial direction is three or less. For example, at the position where the U-phase input terminal 21U is provided in the U-phase power feed conductor 22U, the number of conductors arranged in the radial direction is one. At each of the positions where the V-phase input terminal 31V is provided in the V-phase power feed conductor 32V and where the W-phase input terminal 41W is provided in the W-phase power feed conductor 42W, the number of conductors arranged in the radial direction is two. At the position where the neutral conductor 53 is provided, the number of conductors arranged in the radial direction is two or three. At the position where the neutral conductor 54 is provided, the number of conductors arranged in the radial direction is two or three.

The U-phase power feed conductor 22U has U-phase connection portions 22UC1 and 22UC8. The U-phase connection portions 22UC1 and 22UC8 each are formed to rise from the arc-shaped portion of the U-phase power feed conductor 22U and each have an end having a hook-shaped portion bent radially inward. As shown in FIG. 8, the U-phase connection portions 22UC1 and 22UC8 are disposed outside the resin 81.

The U-phase power feed-side leading wire 23U1 extending from the U-phase coil 24Up1 is connected to the hook-shaped portion of the U-phase connection portion 22UC1. The U-phase power feed-side leading wire 23U1 is disposed to rise from below and put onto the hook-shaped portion of the U-phase connection portion 22UC1, swaged with the hook-shaped portion, welded to the hook-shaped portion, and then, held by the hook-shaped portion.

The U-phase power feed-side leading wire 23U8 extending from the U-phase coil 24Um8 is connected to the hook-shaped portion of the U-phase connection portion 22UC8. The U-phase power feed-side leading wire 23U8 is disposed to rise from below and put onto the hook-shaped portion of the U-phase connection portion 22UC8, swaged with the hook-shaped portion, welded to the hook-shaped portion, and then, held by the hook-shaped portion.

The V-phase power feed conductor 32V has V-phase connection portions 32VC4 and 32VC9. The V-phase connection portions 32VC4 and 32VC9 each are formed to rise from the arc-shaped portion of the V-phase power feed conductor 32V and each have an end having a hook-shaped portion bent radially inward. As shown in FIG. 8, the V-phase connection portions 32VC4 and 32VC9 are disposed outside the resin 81.

The V-phase power feed-side leading wire 33V4 extending from the V-phase coil 34Vm4 is connected to the hook-shaped portion of the V-phase connection portion 32VC4. The V-phase power feed-side leading wire 33V4 is disposed to rise from below and put onto the hook-shaped portion of the V-phase connection portion 32VC4, swaged with the hook-shaped portion, welded to the hook-shaped portion, and then, held by the hook-shaped portion.

The V-phase power feed-side leading wire 33V9 extending from the V-phase coil 34Vp9 is connected to the hook-shaped portion of the V-phase connection portion 32VC9. The V-phase power feed-side leading wire 33V9 is disposed to rise from below and put onto the hook-shaped portion of the V-phase connection portion 32VC9, swaged with the hook-shaped portion, welded to the hook-shaped portion, and then, held by the hook-shaped portion.

The W-phase power feed conductor 42W has W-phase connection portions 42WC5 and 42WC12. The W-phase connection portions 42WC5 and 42WC12 each are formed to rise from the arc-shaped portion of the W-phase power feed conductor 42W and each have an end having a hook-shaped portion bent radially inward. As shown in FIG. 8, the W-phase connection portions 42WC5 and 42WC12 are disposed outside the resin 81.

The W-phase power feed-side leading wire 43W5 extending from the W-phase coil 44Wp5 is connected to the hook-shaped portion of the W-phase connection portion 42WC5. The W-phase power feed-side leading wire 43W5 is disposed to rise from below and put onto the hook-shaped portion of the W-phase connection portion 42WC5, swaged with the hook-shaped portion, welded to the hook-shaped portion, and then, held by the hook-shaped portion.

The W-phase power feed-side leading wire 43W12 extending from the W-phase coil 44Wm12 is connected to the hook-shaped portion of the W-phase connection portion 42WC12. The W-phase power feed-side leading wire 43W12 is disposed to rise from below and put onto the hook-shaped portion of the W-phase connection portion 42WC12, swaged with the hook-shaped portion, welded to the hook-shaped portion, and then, held by the hook-shaped portion.

The neutral conductor 53 has neutral connection portions 53C6, 53C7, and 53C10, The neutral connection portions 53C6, 53C7, and 53C10 each are formed to rise from the arc-shaped portion of the neutral conductor 53 and each have an end having a hook-shaped portion bent radially inward. As shown in FIG. 8, the neutral connection portions 53C6, 53C7, and 53C10 are disposed outside the resin 81.

The W-phase neutral point-side leading wire 46W6 extending from the W-phase coil 44Wp6 is connected to the hook-shaped portion of the neutral connection portion 53C6. The W-phase neutral point-side leading wire 46W6 is disposed to rise from below and put onto the hook-shaped portion of the neutral connection portion 53C6, swaged with the hook-shaped portion, welded to the hook-shaped portion, and then, held by the hook-shaped portion.

The U-phase neutral point-side leading wire 26U7 extending from the U-phase coil 24Um7 is connected to the hook-shaped portion of the neutral connection portion 53C7. The U-phase neutral point-side leading wire 26U7 is disposed to rise from below and put onto the hook-shaped portion of the neutral connection portion 53C7, swaged with the hook-shaped portion, welded to the hook-shaped portion, and then, held by the hook-shaped portion.

The V-phase neutral point-side leading wire 36V10 extending from the V-phase coil 34Vp10 is connected to the hook-shaped portion of the neutral connection portion 53C10. The V-phase neutral point-side leading wire 36V10 is disposed to rise from below and put onto the hook-shaped portion of the neutral connection portion 53C10, swaged with the hook-shaped portion, welded to the hook-shaped portion, and then, held by the hook-shaped portion.

The neutral conductor 54 has neutral connection portions 54C2, 54C3, and 54C11. The neutral connection portions 54C2, 54C3, and 54C11 each are formed to rise from the arc-shaped portion of the neutral conductor 54 and each have an end having a hook-shaped portion bent radially inward. As shown in FIG. 8, the neutral connection portions 54C2, 54C3, and 54C11 are disposed outside the resin 81.

The U-phase neutral point-side leading wire 26U2 extending from the U-phase coil 24Up2 is connected to the hook-shaped portion of the neutral connection portion 54C2. The U-phase neutral point-side leading wire 26U2 is disposed to rise from below and put onto the hook-shaped portion of the neutral connection portion 54C2, swaged with the hook-shaped portion, welded to the hook-shaped portion, and then, held by the hook-shaped portion.

The V-phase neutral point-side leading wire 36V3 extending from the V-phase coil 34Vm3 is connected to the hook-shaped portion of the neutral connection portion 54C3. The V-phase neutral point-side leading wire 36V3 is disposed to rise from below and put onto the hook-shaped portion of the neutral connection portion 54C3, swaged with the hook-shaped portion, welded to the hook-shaped portion, and then, held by the hook-shaped portion.

The W-phase neutral point-side leading wire 46W11 extending from the W-phase coil 44Wm11 is connected to the hook-shaped portion of the neutral connection portion 54C11. The W-phase neutral point-side leading wire 46W11 is disposed to rise from below and put onto the hook-shaped portion of the neutral connection portion 54C11, swaged with the hook-shaped portion, welded to the hook-shaped portion, and then, held by the hook-shaped portion.

The annular bus bar 80 is disposed radially outside of the teeth 16 to which the respective coils 20 are attached. The annular bus bar 80 is disposed along the yoke portion 12. The annular bus bar 80 is disposed so as to be overlaid on the yoke portion 12. The annular bus bar 80 is disposed so as not to protrude radially outward from the outer circumferential surface of the yoke portion 12, so that the stator 4 is prevented from increasing in size in the radial direction.

When the neutral conductors 53 and 54 each are formed of a winding, the neutral conductors 53 and 54 each may be disposed radially outside of the teeth 16 similarly to the annular bus bar 80. Alternatively, the neutral conductors 53 and 54 each may be disposed at a coil end.

A groove along which each leading wire is disposed may be provided in the first flange portion 72 of the bobbin 70 shown in FIG. 4. Each of the power feed-side leading wires and the neutral point-side leading wires is disposed along the groove, so that each wire can extend in the radial direction from the position of the yoke portion 12 to the position of the tooth 16 in the stator core 10.

In FIG. 5, the neutral point 51 is shown in the vicinity of the W-phase coil 44Wp6 and the neutral point 52 is shown in the vicinity of the W-phase coil 44Wm11, but the positons of the neutral points 51 and 52 are not limited thereto. The neutral points 51 and 52 each may be disposed at any position as long as the U phase, the V phase, and the W phase are connected at one point.

It is desirable that the neutral conductors 53 and 54 are formed as separate members and are not electrically connected to each other. In the case where the neutral conductors 53 and 54 are connected to each other, for example, when a potential difference of the line voltage occurs between the V-phase neutral point-side leading wire 36V10 and the W-phase neutral point-side leading wire 46W11, a current flows between the neutral points 51 and 52, so that a current (a circulating current) flows through the coil 20 connected to the neutral point 52. Since this circulating current causes a loss to thereby decrease the efficiency of the electric motor 1, it is desirable that the neutral conductors 53 and 54 are separate members.

Figure 9:
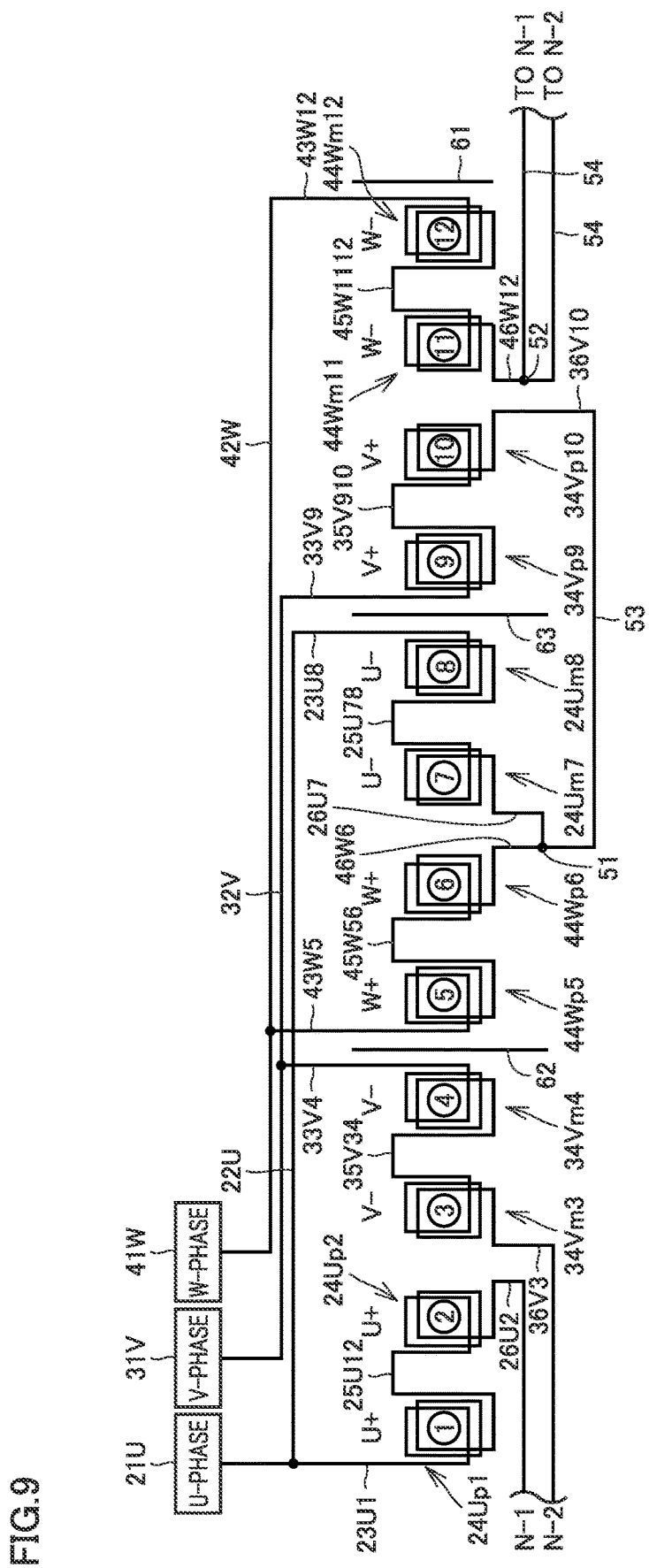
FIG. 9 is a line connection diagram of another example of the stator.

FIG. 9 is a line connection diagram of another example of the stator 4. In the following description of FIG. 9, the same configuration as that in FIG. 5 will not be explained, but an explanation will be given with special attention to a configuration specific in FIG. 9 and different from that in FIG. 5.

In the example shown in FIG. 5, with respect to the coil 20 of each phase, the neutral point-side leading wire of each phase extends on the side where the power feed-side leading wire of each phase extends. On the other hand, in FIG. 9, with respect to the coil 20 of each phase, the neutral point-side leading wire of each phase extends on the side opposite to the side where the power feed-side leading wire of each phase extends. In the example shown in FIG. 9, the neutral conductors 53 and 54 and the neutral points 51 and 52 may be disposed at coil ends, or may be disposed radially inside of the teeth 16.

In the electric motor 1 according to the embodiment described above, the number of poles of the rotor 3 is two and the number of teeth 16 is twelve, as shown in FIGS. 2 and 3. As shown in FIG. 4, a winding is concentratedly wound around the tooth 16 to thereby form the coil 20. As shown in FIGS. 2, 3, and 5, the two teeth 1601 and 1602 adjacent to each other in the circumferential direction form the teeth portion 171, and windings of a U-phase are respectively wound in the same direction around the two teeth 1601 and 1602 forming the teeth portion 171 and are connected in series. The teeth 16 are arranged such that the adjoining teeth portions are different in phase and three phases are arranged sequentially side by side in the circumferential direction.

Thus, a winding is concentratedly wound around a tooth 16 to thereby form the coil 20, windings of the same phase are respectively wound in the same direction around the teeth 16 adjacent to each other in the circumferential direction and are connected in series, and the teeth 16 are arranged such that the teeth portions adjacent to each other in the circumferential direction are different in phase and three phases are arranged sequentially side by side in the circumferential direction, with the result that a simply-structured and small-sized electric motor 1 having a 2-pole and 12-slot configuration can be implemented. Since the number of poles is two that is the smallest number, the electric motor 1 can rotate at a high speed.

From the start to the end of winding around the tooth 16, the winding forming the coil 20 becomes farther away from the tooth 16. By defining the positions of the winding start and the winding end of the coil 20, the position of a leading wire connected to the power feed conductor of each phase or the neutral conductor can be determined, and the position of an insulating tube for insulating such a leading wire can be determined.

Two windings of the same phase are connected in series and the voltage applied to the electric motor 1 is divided to two coils 20, and therefore, the potential difference between the adjoining coils 20 of the same phase is reduced by half. Since the potential difference (interphase potential difference) applied to the films of the adjoining coils 20 can be reduced, the withstand voltage stress on the film of each coil 20 and the insulating material of the bobbin 70 and the like can be reduced. Thus, insulation can be ensured by a standard magnet wire.

As compared with a 6-slot electric motor that is generally selected in the case of two poles, in the 12-slot electric motor 1 of the embodiment, the demagnetizing field from the stator 4 is dispersed in two teeth 16, so that magnetic flux variation relative to the magnet can be reduced, and thus, heat generation from the magnet can be suppressed. The skew effect by the windings of the stator 4 can be achieved, and torque ripples can be reduced. Also, by increasing the area of contact between each of the coils 20 and the stator core 10 to increase the amount of heat transfer, the coils 20 can be effectively cooled.

As shown in FIGS. 2, 3, and 5, a V-phase winding is wound around the teeth portion 172 adjacent to the teeth portion 171 to which a U-phase coil is attached, and thereby, two V-phase coils 34Vm3 and 34Vm4 are formed. The U-phase neutral point-side leading wire 26U2 leading to the neutral point 52 extends from the U-phase coil 24Up2. The V-phase neutral point-side leading wire 36V3 leading to the neutral point 52 extends from the V-phase coil 34Vm3. The tooth 1602 to which the U-phase coil 24Up2 is attached and the tooth 1603 to which the V-phase coil 34Vm3 is attached are adjacent to each other.

Since both the U-phase coil 24Up2 and the V-phase coil 34Vm3 are connected to the neutral point 52, the potential difference between the U-phase coil 24Up2 and the V-phase coil 34Vm3 decreases to such a level at which no insulation is required. By arranging the U-phase coil 24Up2 and the V-phase coil 34Vm3 to be adjacent to each other, the necessity for interphase insulation between the U-phase coil 24Up2 and the V-phase coil 34Vm3 can be eliminated. Since the number of portions requiring interphase insulation in the stator 4 can be reduced to three, the configuration of the stator 4 can be simplified and the manufacturing cost can be reduced.

In order to achieve the electric motor 1 having a 2-pole and 12-slot configuration, the two U-phase coils 24Up1 and 24Up2 connected in series need to be arranged such that the U-phase coil 24Up1 is located upstream of the current flow while the U-phase coil 24Up2 is located downstream of the current flow. Also, the two V-phase coils 34Vm3 and 34Vm4 connected in series and adjacent to the U-phase coils 24Up1 and 24Up2 need to be arranged such that the V-phase coil 34Vm4 is located upstream of the current flow while the V-phase coil 34Vm3 is located downstream of the current flow. As a result, the U-phase coil 24Up2 and the V-phase coil 34Vm3 are located adjacent to each other, and thus, no insulation is required between the U-phase coil 24Up2 and the V-phase coil 34Vm3.

The V-phase coil 34Vp10 shown in FIG. 5 is connected to the neutral point 51 and the W-phase coil 44Wm11 adjacent thereto is connected to the neutral point 52. Since both the electric potentials of the neutral points 51 and 52 are equally zero, the potential difference between the V-phase coil 34Vp10 and the W-phase coil 44Wm11 also decreases to such a level at which no insulation is required. Thus, since the necessity for interphase insulation can be eliminated also between the V-phase coil 34Vp10 and the W-phase coil 44Wm11, the number of portions requiring interphase insulation in the stator 4 can be only three.

As shown in FIGS. 2, 3, and 5, the W-phase coil 44Wm12 is formed by winding a W-phase winding around the teeth portion 176 that is adjacent to the teeth portion 171 having the U-phase coil attached thereto and that is opposite to the teeth portion 172 having the V-phase coils 34Vm3 and 34Vm4 attached thereto, with respect to the teeth portion 171. The interphase insulation paper 61 is disposed between the U-phase winding forming the U-phase coil 24Up1 and the W-phase winding forming the W-phase coil 44Wm12. The interphase insulation paper 61 insulates the U-phase winding forming the U-phase coil 24Up1 from the W-phase winding forming the W-phase coil 44Wm12.

The U-phase power feed-side leading wire 23U1 connected to the U-phase input terminal 21U extends from the U-phase coil 24Up1. The W-phase power feed-side leading wire 43W12 connected to the W-phase input terminal 41W extends from the W-phase coil 44Wm12. There is a possibility that a potential difference may occur between the U-phase coil 24Up1 and the W-phase coil 44Wm12 adjacent to each other. Disposing the interphase insulation paper 61 between the U-phase coil 24Up1 and the W-phase coil 44Wm12 can ensure insulation between the U-phase coil 24Up1 and the W-phase coil 44Wm12.

As shown in FIG. 5, the electric motor 1 further includes the U-phase power feed conductor 22U, the V-phase power feed conductor 32V, the W-phase power feed conductor 42W, and the neutral conductors 53 and 54. The U-phase power feed conductor 22U forms a power feed path that leads to the U-phase coils 24Up1 and 24Up2. The V-phase power feed conductor 32V forms a power feed path that leads to the V-phase coils 34Vm3 and 34Vm4. The W-phase power feed conductor 42W forms a power feed path that leads to the W-phase coils 44Wm11 and 44Wm12 to the neutral conductor 54 electrically connects the U-phase coils 24Up1 and 24Up2 to the neutral point 52, electrically connects the V-phase coils 34Vm3 and 34Vm4 to the neutral point 52, and electrically connects the W-phase coils 44Wm11 and 44Wm12 to the neutral point 52. As shown in FIGS. 6 and 7, each of the U-phase power feed conductor 22U, the V-phase power feed conductor 32V, the W-phase power feed conductor 42W, and the neutral conductors 53 and 54 has an arc shape. As shown in FIG. 8, the power feed conductors 22U, 32V, and 42W of three phases and the neutral conductors 53 and 54 are positioned by the resin 81 having an annular shape. Among the U-phase power feed conductor 22U, the V-phase power feed conductor 32V, the W-phase power feed conductor 42W, and the neutral conductors 53 and 54, the number of conductors arranged in the radial direction is three or less.

Among the U-phase power feed conductor 22U, the V-phase power feed conductor 32V, the W-phase power feed conductor 42W, and the neutral conductors 53 and 54, the number of conductors located at the same position in the circumferential direction and arranged in the radial direction is three or less at any position in the circumferential direction. Thereby, the space in which the conductors are arranged can be reduced, and thus, the stator 4 can be reduced in size. In addition, the number of positions requiring insulation between the conductors can be reduced.

As shown in FIGS. 6 and 7, the V-phase power feed conductor 32V includes: the first portion 32V1 disposed radially outside of the U-phase power feed conductor 22U; and the second portion 32V2 disposed radially inside of the W-phase power feed conductor 42W.

This makes it possible to achieve a configuration in which, among the U-phase power feed conductor 22U, the V-phase power feed conductor 32V, the W-phase power feed conductor 42W, and the neutral conductors 53 and 54, the number of conductors arranged in the radial direction is three or less, so that the stator 4 can be prevented from increasing in size in the radial direction.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A rotating electric machine comprising:
    a stator including
        a stator core including a yoke portion having a cylindrical shape and twelve teeth each protruding radially inward from the yoke portion, and
        coils of three phases, a winding being concentratedly wound around each of the teeth to form each of the coils; and
    a rotor rotatable relative to the stator, a number of poles of the rotor being two, wherein
    the teeth include two teeth located adjacent to each other in a circumferential direction and forming a teeth portion, and the windings of a same phase are respectively wound in a same direction and such that current flowing directions through the windings are the same around the two teeth forming the teeth portion and are connected in series, and
    the teeth are arranged such that the teeth portions adjacent to each other are different in phase and the three phases are arranged sequentially side by side in the circumferential direction.

2. The rotating electric machine according to claim 1, wherein
    the coils of three phases are disposed such that coils of a first phase, coils of a second phase, and coils of a third phase are arranged sequentially side by side so as to correspond to six of the teeth portions, the six teeth portions being arranged in the circumferential direction,
    the coils of the second phase are attached to a teeth portion adjacent to a teeth portion to which the coils of the first phase are attached,
    a first-phase leading wire leading to a neutral point extends from one of the windings of the coils of the first phase,
    a second-phase leading wire leading to the neutral point extends from one of the windings of the coils of the second phase, and
    the winding forming a coil of the first phase from which the first-phase leading wire extends and the winding forming a coil of the second phase from which the second-phase leading wire extends are respectively wound around two of the teeth, the two teeth being adjacent to each other in the circumferential direction.

3. The rotating electric machine according to claim 2, wherein
    the coils of the third phase are attached to the teeth portion that is adjacent to the teeth portion to which the coils of the first phase are attached and that is opposite to the teeth portion to which the coils of the second phase are attached, with respect to the teeth portion to which the coils of the first phase are attached, and
    the stator further includes an interphase insulator disposed between the winding forming a coil of the first phase and the winding forming a coil of the third phase that are adjacent to each other, to insulate the winding forming the coil of the first phase from the winding forming the coil of the third phase.

4. The rotating electric machine according to claim 1, further comprising:
    power feed conductors of three phases that form a power feed path leading to the coils of three phases; and
    a neutral conductor that electrically connects the coils of three phases to a neutral point, wherein
    the power feed conductors of three phases and the neutral conductor are arranged along the yoke portion and each have an arc shape,
    the power feed conductors of three phases and the neutral conductor are positioned by a resin having an annular shape, and
    among the power feed conductors of three phases and the neutral conductor, a number of conductors arranged in a radial direction is three or less.

5. The rotating electric machine according to claim 4, wherein
    the power feed conductors of three phases include a first-phase power feed conductor, a second-phase power feed conductor, and a third-phase power feed conductor, and
    the second-phase power feed conductor has a first portion disposed radially outside of the first-phase power feed conductor and a second portion disposed radially inside of the third-phase power feed conductor.

* * * * *